2,924,796
BUSHING-TYPE CURRENT TRANSFORMERS

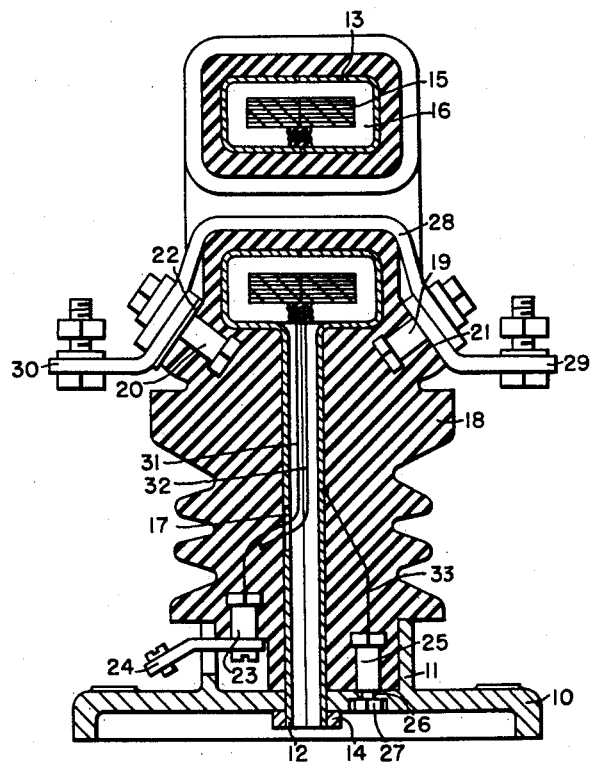

Georg Stauber and Vinzenz Greger, Neuhaus b. Hochstadt, Aisch, Germany, assignors to Siemens-Schuckertwerke Aktiengesellschaft, Erlangen, Germany, a corporation of Germany Application July 14, 1955, Serial No. 522,004

Claims priority, application Germany August 7, 1954

3 Claims. (Cl. 336—96)

This invention relates generally to current transformers and more particularly to the bushing-type current transformers.

The object of the invention is to provide for utilizing a moldable insulating resinous material to support the parts of a current transformer in their proper relative positions and insulated from one another.

The invention accordingly comprises an article of manufacture possessing the features, properties, and relation of elements which will be exemplified in the article hereinafter described and the scope of the application of which will be indicated in the claims.

For a fuller understanding of the nature and object of the invention reference should be had to the following detailed description taken in connection with the accompanying drawing, in which:

The single figure is a view partly in section and partly in elevation of a bushing transformer embodying the features of the invention.

Referring now to the drawing, a base 10 having a vertical collar 11 is provided. The base may be cast or formed by stamping, in which case the collar 11 may be applied by welding.

The tubular member 12 and an annular casing 13 are mounted on the base 10. In order to utilize the case 13 and tubular member 12 for containing members of the current transformer to be described hereinafter, it is made in two sections as illustrated. The tubular member 12 may be attached to the base by means of a nut 14 or by welding.

In assembling the transformer a core 15 provided with a secondary winding 16 will be disposed in one of the sections of the case 13 and the tubular member 12. The halves of the casing are then fitted together and fastened enclosing the members 15 and 16. The leads from the secondary winding extend downwardly through the tubular member 12 and out through the opening 17. When the sections of the case 13 and tube 12 are brought together they may be tack welded or fastened together by any method well known in shop practice. The tubular member is then fitted in the opening illustrated in the base 10 and the nut 14 is mounted thereon.

Since the case 13 and tubular member 12 are to be enclosed by a suitable insulating moldable material, it is preferable that these members be made from zinc sheets since zinc forms a much stronger bond with the moldable resins than most other metals. However, it is to be understood that other metals may also be used for making the case 13 and tubular member 12.

After the casing and tubular member 12 have been disposed in position and properly supported, a mass of some suitable insulating moldable resinous material 18 will be molded thereon. Many suitable moldable resinous materials are available. Good results have been accomplished by using melamine formaldehyde molding material or silicone rubber. These materials have good insulating characteristics and may be readily molded.

In molding the resinous material around the annular case 13 care will be observed to preserve an adequate opening therethrough. Further, the lower portion of the mass of molded resinous material will be provided with flanges as illustrated.

In molding the resinous material a number of other parts are molded therein for purposes to be now described. In the upper portion of the mass of resinous material just below the annular casing, supports 19 and 20 for the primary conductor or winding are embedded as shown. These supports 19 and 20 are disposed in shoulders 21 and 22 provided in the mass of resinous material. Near the lower end of the tubular member 12 a support 23 for a terminal member 24 is molded into an undercut portion of the bushing member. Further, a plurality of bolts such as 25 are molded into the base of the bushing member and extend through openings 26 provided in the base member 10. These bolts serve to fasten the bushing firmly in position on the base 10 and are anchored to it by means of nuts 27.

The primary conductor or winding 28 extends through the annular casing 13 and is mounted on the supports 19 and 20. Connectors 29 and 30 are also mounted on the supports 19 and 20 respectively. The terminal members are provided for making the necessary transformer connections.

Leads 31 and 32 are brought downwardly from the secondary winding 15 through the tubular member and out through opening 17. As shown, lead 31 is connected to the terminal member 24. The tubular member 12 is grounded through lead 33 and bolt 25.

A structure of this kind can be made light in weight and the member properly disposed to insulate them from one another to give correct functioning. Further, the parts lend themselves to economical manufacture.

Since certain changes may be made in the above article and different embodiments of the invention could be made without departing from the scope thereof, it is intended that all matter contained in the above description or shown in the accompanying drawing shall be interpreted as illustrative and not in a limiting sense.

We claim as our invention:

1. In a current transformer, in combination, a base for mounting a transformer, a tubular member carried by the base, a hollow annular casing carried by the tubular member, a ring-shaped core carrying a secondary winding enclosed in the casing, a resinous insulating material molded around the tubular member and casing and connected to said base, the resinous material being so disposed around the casing as to preserve the opening therethrough, supports for a primary winding molded into the resinous material, a primary winding extending through the opening in the annular casing and mounted on the supports, terminal members for the secondary winding and ground connections molded into the resinous material, leads connecting the secondary winding and tubular member to the terminal members.

2. In a current transformer, in combination, a base for mounting a transformer, a metallic tubular member carried by the base, a hollow annular casing disposed on the metallic tubular member, a core and secondary winding enclosed in the annular casing, a resinous insulating material so molded on the tubular member, base and annular casing as to completely enclose the tubular member and annular casing, supports molded in the insulating resinous material near the annular casing, terminals for the secondary winding and ground connections molded into the resinous insulating material near the base, and a primary winding extending through the annular casing carrying the core and terminal connectors disposed on the supports.

3. In a current transformer, in combination, a base for mounting a transformer, a metallic tubular member carried by the base, an annular casing disposed on the tubular member, a core and secondary winding for the transformer enclosed in the annular casing, a resinous insulating material so molded on the tubular member, base and annular casing as to completely enclose the tubular member and annular casing forming a bushing for supporting the current transformer, terminals for the secondary winding and ground connections molded into the resinous insulating material, supports for the primary winding and terminal connectors also molded into the mass of resinous material near the annular casing, and a primary winding and terminal members mounted on the supports, the primary winding extending through the opening in the annular casing, the secondary winding and tubular member being connected to the terminal members molded into the botttom of the mass of molded material, the mass of molded material serving to enclose the casing and support the windings in the manner of a bushing.

References Cited in the file of this patent

UNITED STATES PATENTS

| | | |
|---|---|---|
| 826,283 | Schmidt | July 17, 1906 |
| 1,729,492 | Sauer | Sept. 24, 1929 |
| 1,766,048 | Trogner | June 24, 1930 |
| 2,222,729 | Ver Planck et al. | Nov. 26, 1940 |
| 2,382,199 | Brink | Aug. 14, 1945 |